(12) United States Patent
Furcoiu et al.

(10) Patent No.: US 11,306,463 B2
(45) Date of Patent: *Apr. 19, 2022

(54) HYDRANT SHOE ASSEMBLY

(71) Applicant: Mueller International, LLC, Atlanta, GA (US)

(72) Inventors: Aurelian Ioan Furcoiu, Chattanooga, TN (US); Wright Hackett, Tunnel Hill, GA (US)

(73) Assignee: Mueller International, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/942,996

(22) Filed: Jul. 30, 2020

(65) Prior Publication Data

US 2020/0354930 A1 Nov. 12, 2020

Related U.S. Application Data

(63) Continuation of application No. 16/121,132, filed on Sep. 4, 2018, now Pat. No. 10,774,508.

(51) Int. Cl.
*E03B 9/02* (2006.01)
*F16L 21/03* (2006.01)
*F16L 21/06* (2006.01)

(52) U.S. Cl.
CPC ............... *E03B 9/02* (2013.01); *F16L 21/03* (2013.01); *F16L 21/065* (2013.01)

(58) Field of Classification Search
CPC .... E03B 9/02; E03B 9/04; F16L 21/03; F16L 21/065
See application file for complete search history.

(56) References Cited

U.S. PATENT DOCUMENTS 1,945,293 A 1/1934 Pierce
1,964,044 A 6/1934 Engel
(Continued)

FOREIGN PATENT DOCUMENTS

CA 2458710 8/2005
CA 2458788 8/2005
(Continued)

OTHER PUBLICATIONS

US 11,149,889 B2, 10/2021, Furcoiu (withdrawn)
(Continued)

*Primary Examiner* — David Bochna
(74) *Attorney, Agent, or Firm* — Taylor English Duma LLP

(57) ABSTRACT

Example aspects a hydrant shoe assembly and a method for assembling a hydrant shoe assembly are disclosed. The hydrant shoe assembly can comprise a shoe body defining a shoe body outer surface and a shoe body inner surface, the shoe body inner surface defining a void, the void defining an inlet end and an outlet end, an opening extending from the shoe body inner surface to the shoe body outer surface, the opening oriented proximate to the inlet end; a harness received in the void, the harness defining a harness inner surface and a harness outer surface, a protuberance extending radially outward from harness outer surface, the protuberance engaging the opening; and a pipe extending into the void through the inlet end, the harness inner surface engaging the pipe.

20 Claims, 8 Drawing Sheets

(56) References Cited

U.S. PATENT DOCUMENTS

| | | |
|---|---|---|
| 2,355,407 A | 8/1944 | Wyss |
| 2,394,351 A | 2/1946 | Wurzburger |
| 2,693,374 A | 11/1954 | Wurzburger |
| 2,887,328 A | 5/1959 | Risley et al. |
| 3,081,102 A | 3/1963 | Murray et al. |
| 3,150,876 A | 9/1964 | Lafferty |
| 3,162,469 A | 12/1964 | Shohan |
| 3,163,432 A | 12/1964 | De Boer |
| 3,179,446 A | 4/1965 | Paterson |
| 3,186,741 A | 6/1965 | Kurtz |
| 3,211,472 A | 10/1965 | Rickard |
| 3,249,371 A | 3/1966 | Peterman |
| 3,252,192 A | 5/1966 | Smith |
| 3,315,970 A | 4/1967 | Holoway |
| 3,315,971 A | 4/1967 | Sakurada |
| 3,414,273 A | 12/1968 | Sumner |
| 3,432,190 A | 3/1969 | Kunz |
| 3,485,515 A | 12/1969 | Frishof |
| 3,573,871 A | 4/1971 | Warner et al. |
| 3,642,306 A | 2/1972 | Gheen et al. |
| 3,653,695 A | 4/1972 | Dunton et al. |
| 3,680,874 A | 8/1972 | Schwarz |
| 3,684,317 A | 8/1972 | Kazienko et al. |
| 3,698,744 A | 10/1972 | Bevington |
| 3,877,733 A | 4/1975 | Straub |
| 3,980,097 A | 9/1976 | Ellis |
| 4,092,036 A | 5/1978 | Sato et al. |
| 4,380,348 A | 4/1983 | Swartz |
| 4,397,485 A | 8/1983 | Wood |
| 4,410,479 A | 10/1983 | Cyriax |
| 4,522,434 A | 6/1985 | Webb |
| 4,538,841 A | 9/1985 | Royston |
| 4,544,188 A | 10/1985 | Dugger |
| 4,568,112 A | 2/1986 | Bradley, Jr. et al. |
| 4,569,542 A | 2/1986 | Anderson et al. |
| 4,609,210 A | 9/1986 | Torokvei et al. |
| 4,629,176 A | 12/1986 | Ceelen |
| 4,664,426 A | 5/1987 | Ueki |
| 4,741,356 A | 5/1988 | Letzo et al. |
| 4,768,813 A | 9/1988 | Timmons |
| 4,779,900 A | 10/1988 | Shumard |
| 4,791,952 A | 12/1988 | Laurel |
| 4,848,808 A | 7/1989 | Pannell et al. |
| 4,858,968 A | 8/1989 | Moebius |
| 4,890,967 A | 1/1990 | Rosenbaum |
| 5,069,490 A | 12/1991 | Halen, Jr. |
| 5,071,175 A | 12/1991 | Kennedy, Jr. |
| 5,121,946 A | 6/1992 | Jardine |
| 5,205,568 A | 4/1993 | Stoll et al. |
| 5,232,252 A | 8/1993 | Bartholomew |
| 5,297,826 A | 3/1994 | Percebois et al. |
| 5,324,083 A | 6/1994 | Vogelsang |
| 5,335,946 A | 8/1994 | Dent et al. |
| 5,398,980 A | 3/1995 | Hunter |
| 5,437,481 A | 8/1995 | Spears et al. |
| 5,468,025 A | 11/1995 | Adinolfe et al. |
| 5,476,292 A | 12/1995 | Harper |
| 5,498,042 A | 3/1996 | Dole |
| 5,505,499 A | 4/1996 | Wallbank |
| 5,544,922 A | 8/1996 | Shumard et al. |
| 5,803,110 A | 9/1998 | Segal |
| 5,851,037 A | 12/1998 | Bridges |
| 5,941,576 A | 8/1999 | Krausz |
| 6,106,029 A | 8/2000 | Demore et al. |
| 6,173,993 B1 | 1/2001 | Shumard et al. |
| 6,273,469 B1 | 8/2001 | Kwaske et al. |
| 6,364,372 B1 | 4/2002 | Marandi |
| 6,457,718 B1 | 10/2002 | Quesada |
| 6,481,762 B1 | 11/2002 | Rex et al. |
| 6,830,268 B2 | 12/2004 | Krausz |
| 7,232,160 B2 | 6/2007 | Krausz |
| 7,243,955 B2 | 7/2007 | Krausz et al. |
| 7,469,939 B2 | 12/2008 | Westman et al. |
| 7,571,940 B2 | 8/2009 | Krausz |
| D602,127 S | 10/2009 | Shah et al. |
| 7,625,018 B2 | 12/2009 | Krausz |
| 7,654,586 B2 | 2/2010 | Krausz |
| 7,748,753 B2 | 7/2010 | Krausz |
| 7,837,238 B2 | 11/2010 | Krausz et al. |
| 7,883,126 B2 | 2/2011 | Terry et al. |
| 7,997,626 B2 | 8/2011 | Krausz |
| 7,997,628 B1 | 8/2011 | Smith, Jr. et al. |
| 8,042,816 B2 | 10/2011 | Krausz |
| 8,313,124 B2 | 11/2012 | Krausz |
| 8,408,606 B2 | 4/2013 | Krausz |
| 8,651,530 B2 | 2/2014 | Krausz |
| 8,857,861 B2 | 10/2014 | German |
| 8,870,189 B2 | 10/2014 | Krausz |
| 8,960,683 B2 | 2/2015 | Krausz |
| 8,960,729 B2 | 2/2015 | Chiproot |
| D724,185 S | 3/2015 | Chiproot |
| 9,086,177 B2 | 7/2015 | Artsiely |
| 9,109,701 B1 | 8/2015 | Copeland |
| 9,163,760 B2 | 10/2015 | Lundstrom et al. |
| 9,441,771 B2 | 9/2016 | German |
| 9,890,883 B2 | 2/2018 | Maenishi et al. |
| 10,018,290 B2 | 7/2018 | Kishi et al. |
| 10,107,428 B2 | 10/2018 | Kim |
| 10,677,381 B2 | 6/2020 | Furcoiu |
| 10,774,508 B2 * | 9/2020 | Furcoiu ................. F16L 21/065 |
| 10,851,920 B2 | 12/2020 | Showkathali et al. |
| 10,941,887 B2 | 3/2021 | Furcoiu |
| 11,131,412 B2 | 9/2021 | Furcoiu |
| 11,162,621 B2 | 11/2021 | Furcoiu |
| 11,193,609 B2 | 12/2021 | Furcoiu |
| 11,199,280 B2 | 12/2021 | Furcoiu |
| 11,215,306 B2 | 1/2022 | Furcoiu |
| 2002/0017789 A1 | 2/2002 | Holmes |
| 2002/0037194 A1 | 3/2002 | Gentile |
| 2003/0085566 A1 | 5/2003 | Rex et al. |
| 2004/0108713 A1 | 6/2004 | Krausz |
| 2004/0232698 A1 | 11/2004 | Jones |
| 2005/0194784 A1 | 9/2005 | Jones et al. |
| 2005/0253380 A1 | 11/2005 | Gibb et al. |
| 2006/0012172 A1 | 1/2006 | Kennedy |
| 2006/0087121 A1 | 4/2006 | Bradley |
| 2007/0108766 A1 | 5/2007 | Riordan et al. |
| 2007/0295406 A1 | 12/2007 | German et al. |
| 2009/0243289 A1 | 10/2009 | Madara et al. |
| 2010/0289256 A1 | 11/2010 | Shumard |
| 2011/0084484 A1 | 4/2011 | German et al. |
| 2011/0095519 A1 | 4/2011 | Krausz |
| 2011/0291409 A1 | 12/2011 | Kennedy, Jr. et al. |
| 2012/0025524 A1 | 2/2012 | Krausz |
| 2012/0119485 A1 | 5/2012 | Cichorek et al. |
| 2012/0299294 A1 | 11/2012 | Chiproot |
| 2012/0299295 A1 | 11/2012 | Chiproot |
| 2013/0056980 A1 | 3/2013 | Chiproot |
| 2013/0328305 A1 | 12/2013 | Chiproot |
| 2014/0001709 A1 | 1/2014 | Chiproot |
| 2014/0319781 A1 | 10/2014 | Chiproot |
| 2014/0319826 A1 | 10/2014 | Chiproot |
| 2015/0176728 A1 | 6/2015 | Bowman |
| 2015/0204468 A1 | 7/2015 | Jones |
| 2017/0030489 A1 | 2/2017 | Decesare et al. |
| 2017/0114933 A1 | 4/2017 | Copeland |
| 2017/0130431 A1 | 5/2017 | Pinney et al. |
| 2018/0306354 A1 | 10/2018 | Furcoiu |
| 2018/0306361 A1 | 10/2018 | Furcoiu |
| 2018/0306362 A1 | 10/2018 | Furcoiu |
| 2019/0017636 A1 | 1/2019 | Furcoiu |
| 2019/0145565 A1 | 5/2019 | Furcoiu |
| 2019/0264843 A1 | 8/2019 | Furcoiu |
| 2019/0331265 A1 | 10/2019 | Bowman |
| 2020/0025321 A1 | 1/2020 | Furcoiu |
| 2020/0063900 A1 | 2/2020 | Furcoiu |
| 2020/0071915 A1 | 3/2020 | Furcoiu et al. |
| 2020/0248847 A1 | 8/2020 | Furcoiu |
| 2020/0248848 A1 | 8/2020 | Furcoiu |
| 2020/0263814 A1 | 8/2020 | Furcoiu |
| 2021/0018125 A1 | 1/2021 | Mitchell et al. |
| 2021/0102647 A1 | 4/2021 | Furcoiu |

(56) References Cited

U.S. PATENT DOCUMENTS

| | | |
|---|---|---|
| 2021/0324980 A1 | 10/2021 | Furcoiu |
| 2021/0381632 A1 | 12/2021 | Furcoiu |
| 2022/0018472 A1 | 1/2022 | Furcoiu |

FOREIGN PATENT DOCUMENTS

| | | |
|---|---|---|
| CA | 2944828 | 11/2015 |
| CN | 1894531 | 1/2007 |
| CN | 202168185 | 3/2012 |
| DE | 19837803 | 3/2000 |
| DE | 202016100359 | 3/2016 |
| EP | 0273999 | 7/1988 |
| EP | 2463567 | 6/2012 |
| EP | 2494249 | 9/2012 |
| GB | 1311434 | 3/1973 |
| GR | 3030125 | 7/1999 |
| IL | 196511 | 1/2009 |
| IL | 196817 | 2/2009 |
| IL | 209936 | 12/2010 |
| KR | 100946658 | 3/2010 |
| KR | 101049449 | 7/2011 |
| KR | 20140062744 | 5/2014 |
| KR | 101418783 | 7/2014 |
| KR | 20160082923 | 7/2016 |
| WO | 2004048835 | 6/2004 |
| WO | 2011123865 | 10/2011 |
| WO | 2016108517 | 7/2016 |
| WO | 2018194787 | 10/2018 |
| WO | 2019212771 | 11/2019 |
| WO | 2020040995 | 2/2020 |
| WO | 2020050954 | 3/2020 |
| WO | 2020146073 | 7/2020 |
| WO | 2021015809 | 1/2021 |

OTHER PUBLICATIONS

Furcoiu, Aurelian Ioan; Notice of Allowance for U.S. Appl. No. 15/882,512, filed Jan. 29, 2018, dated May 24, 2021, 23 pgs.
Furcoiu, Aurelian Ioan; Final Office Action for U.S. Appl. No. 16/575,013, filed Sep. 18, 2019, dated Jun. 17, 2021, 15 pgs.
Furcoiu, Aurelian Ioan; Final Office Action for U.S. Appl. No. 16/242,059, filed Jan. 8, 2019, dated Jun. 11, 2021, 24 pgs.
Furcoiu, Aurelian Ioan; Final Office Action for U.S. Appl. No. 15/908,096, filed Feb. 28, 2018, dated May 26, 2021, 22 pgs.
Furcoiu, Aurelian Ioan; Supplemental Notice of Allowance for U.S. Appl. No. 15/966,796, filed Apr. 30, 2018, dated May 19, 2021, 6 pgs.
Furcoiu, Aurelian Ioan; Supplemental Notice of Allowance for U.S. Appl. No. 15/966,796, filed Apr. 30, 2018, dated Aug. 3, 2021, 7 pgs.
Furcoiu, Aurelian Ioan; Final Office Action for U.S. Appl. No. 16/109,204, filed Aug. 22, 2018, dated Jun. 14, 2021, 22 pgs.
Furcoiu, Aurelian Ioan; Notice of Allowance for U.S. Appl. No. 16/266,835, filed Feb. 4, 2019, dated Jul. 2, 2021, 11 pgs.
Furcoiu, Aurelian Ioan; International Preliminary Report on Patentability for PCT Application No. PCT/US19/65201, filed Dec. 9, 2019, dated Jul. 22, 2021, 9 pgs.
Furcoiu, Aurelian Ioan; Office Action for Chinese patent application No. 201880026432.6, file Mar. 21, 2018, dated May 28, 2021, 18 pgs.
Furcoiu, Aurelian Ioan; Non-Final Office Action for U.S. Appl. No. 16/242,059, filed Jan. 8, 2019, dated Nov. 20, 2020, 52 pgs.
Furcoiu, Aurelian Ioan; Corrected Notice of Allowance for U.S. Appl. No. 15/649,022, filed Jul. 13, 2017, dated Jan. 1, 2021, 8 pgs.
Furcoiu, Aurelian Ioan; Corrected Notice of Allowance for U.S. Appl. No. 15/649,022, filed Jul. 13, 2017, dated Nov. 12, 2020, 7 pgs.
Furcoiu, Aurelian Ioan; Corrected Notice of Allowance for U.S. Appl. No. 15/649,022, filed Jul. 13, 2017, dated Nov. 16, 2020, 9 pgs.
Furcoiu, Aurelian Ioan; Notice of Allowance for U.S. Appl. No. 15/649,022, filed Jul. 13, 2017, dated Dec. 9, 2020, 9 pgs.
Furcoiu, Aurelian Ioan; Non-Final Office Action for U.S. Appl. No. 15/908,096, filed Feb. 28, 2018, dated Dec. 15, 2020, 23 pgs.
Furcoiu, Aurelian Ioan; Non-Final Office Action for U.S. Appl. No. 16/109,204, filed Aug. 22, 2018, dated Dec. 22, 2020, 65 pgs.
Furcoiu, Aurelian Ioan; Requirement for Restriction/Election for U.S. Appl. No. 16/109,204, filed Mar. 22, 2018, dated Oct. 27, 2020, 6 pgs.
Furcoiu, Aurelian Ioan; Office Action for European patent application No. 18787054.8, filed Mar. 21, 2018, dated Dec. 22, 2020, 3 pgs.
Furcoiu, Aurelian Ioan; International Preliminary Report on Patentability for PCT Application No. PCT/US19/28339, filed Apr. 19, 2019, dated Nov. 12, 2020, 7 pgs.
Furcoiu, Aurelian Ioan; Non-Final Office Action for U.S. Appl. No. 16/575,013, filed Sep. 18, 2019, dated Mar. 10, 2021, 55 pgs.
Furcoiu, Aurelian Ioan; Corrected Notice of Allowance for U.S. Appl. No. 15/649,022, filed Jul. 13, 2017, dated Feb. 3, 2021, 7 pgs.
Furcoiu, Aurelian Ioan; Notice of Allowance for U.S. Appl. No. 15/966,796, filed Apr. 30, 2018, dated Mar. 26, 2021, 26 pgs.
Furcoiu, Aurelian Ioan; Non-Final Office Action for U.S. Appl. No. 16/266,835, filed Feb. 4, 2019, dated Mar. 24, 2021, 62 pgs.
Furcoiu, Aurelian Ioan; Requirement for Restriction/Election for U.S. Appl. No. 16/266,835, filed Feb. 4, 2019, dated Feb. 22, 2021, 6 pgs.
Furcoiu, Aurelian Ioan; International Preliminary Report on Patentability for PCT Application No. PCT/US19/46085, filed Aug. 12, 2019, dated Mar. 18, 2021, 10 pgs.
Furcoiu, Aurelian Ioan; International Preliminary Report on Patentability for PCT Application No. PCT/US 19/45453, filed Aug. 7, 2019, dated Mar. 4, 2021, 8 pgs.
Furcoiu, Aurelian Ioan; Non-Final Office Action for U.S. Appl. No. 15/490,926, filed Apr. 19, 2017, dated Aug. 14, 2019, 30 pgs.
Furcoiu, Aurelian Ioan; Notice of Allowance for U.S. Appl. No. 15/490,926, filed Apr. 19, 2017, dated Feb. 12, 2020, 15 pgs.
Furcoiu, Aurelian Ioan; Requirement for Restriction/Election for U.S. Appl. No. 15/490,926, filed Apr. 19, 2017, dated Jul. 1, 2019, 9 pgs.
Furcoiu, Aurelian Ioan; Supplemental Notice of Allowance for U.S. Appl. No. 15/490,926, filed Apr. 19, 2017, dated Mar. 12, 2020, 9 pgs.
Furcoiu, Aurelian Ioan; Supplemental Notice of Allowance for U.S. Appl. No. 15/490,926, filed Apr. 19, 2017, dated May 14, 2020, 7 pgs.
Furcoiu, Aurelian Ioan; Non-Final Office Action for U.S. Appl. No. 15/882,512, filed Jan. 29, 2018, dated Jun. 26, 2020, 20 pgs.
Furcoiu, Aurelian Ioan; Non-Final Office Action for U.S. Appl. No. 15/882,512, filed Jan. 29, 2018, dated Dec. 12, 2019, 42 pgs.
Furcoiu, Aurelian Ioan; Requirement for Restriction/Election for U.S. Appl. No. 15/882,512, filed Jan. 29, 2018, dated Jul. 25, 2019, 8 pgs.
Furcoiu, Aurelian Ioan; Non-Final Office Action for U.S. Appl. No. 15/649,022, filed Jul. 13, 2017, dated Jun. 25, 2020, 55 pgs.
Furcoiu, Aurelian Ioan; Notice of Allowance for U.S. Appl. No. 15/649,022, filed Jul. 13, 2017, dated Oct. 1, 2020, 16 pgs.
Furcoiu, Aurelian Ioan; Requirement for Restriction/Election for U.S. Appl. No. 15/649,022, filed Jul. 13, 2017, dated May 19, 2020, 6 pgs.
Furcoiu, Aurelian Ioan; Non-Final Office Action for U.S. Appl. No. 15/908,096, filed Feb. 28, 2018, dated Jun. 18, 2020, 54 pgs.
Furcoiu, Aurelian Ioan; Non-Final Office Action for U.S. Appl. No. 15/966,796, filed Apr. 20, 2018, dated Feb. 24, 2020, 40 pgs.
Furcoiu, Aurelian Ioan; Non-Final Office Action for U.S. Appl. No. 15/966,796, filed Apr. 30, 2018, dated Sep. 3, 2020, 19 pgs.
Furcoiu, Aurelian Ioan; Requirement for Restriction/Election for U.S. Appl. No. 15/966,796, filed Apr. 30, 2018, dated Sep. 27, 2019, 8 pgs.
Furcoiu, Aurelian Ioan; Corrected Notice of Allowance for U.S. Appl. No. 16/121,132, filed Sep. 4, 2018, dated Aug. 12, 2020, 8 pgs.
Furcoiu, Aurelian Ioan; Final Office Action for U.S. Appl. No. 16/121,132, filed Sep. 4, 2018, dated Apr. 20, 2020, 17 pgs.

(56) References Cited

OTHER PUBLICATIONS

Furcoiu, Aurelian Ioan; Non-Final Office Action for U.S. Appl. No. 16/121,132, filed Sep. 4, 2018, dated Nov. 12, 2019,31 pgs.

Furcoiu, Aurelian Ioan; Notice of Allowance for U.S. Appl. No. 16/121,132, filed Sep. 4, 2018, dated Jun. 12, 2020, 9 pgs.

Furcoiu, Aurelian Ioan; International Preliminary Report on Patentability for PCT Application No. PCT/US18/23554, Filed Mar. 21, 2018, dated Oct. 31, 2019, 8 pgs.

Furcoiu, Aurelian Ioan; International Search Report for PCT Application No. PCT/US18/23554, filed Mar. 21, 2018, dated Jun. 6, 2018, 10 pgs.

Furcoiu, Aurelian Ioan; International Search Report and Written Opinion for PCT Application No. PCT/US19/65201, filed Dec. 9, 2019, dated Feb. 24, 2020, 10 pgs.

Furcoiu, Aurelian Ioan; International Search Report and Written Opinion for PCT Application No. PCT/US 19/28339, filed Apr. 19, 2019, dated Jun. 26, 2019, 8 pgs.

Furcoiu, Aurelian Ioan; International Search Report and Written Opinion for PCT Application No. PCT/US 19/46085, filed Aug. 12, 2019, dated Dec. 11, 2019, 13 pgs.

Furcoiu, Aurelian Ioan; Invitation to Pay Additional Fees for PCT/US19/46085, filed Aug. 12, 2019, dated Oct. 9, 2019, 2 pgs.

Furcoiu, Aurelian Ioan; International Search Report and Written Opinion for PCT Application No. PCT/US 19/45453, filed Aug. 7, 2019, dated Oct. 28, 2019, 9 pgs.

Mitchell, Timothy J.; International Search Report and Written Opinion for PCT Application No. PCT/US19/65337, filed Dec. 10, 2019, dated Feb. 5, 2020, 9 pgs.

Mueller International, LLC; Presentation which includes descriptions and images of known restraint devices. The restraint devices were publicly available prior to Apr. 19, 2017, 39 pgs.

Furcoiu, Aurelian Ioan; Final Office Action for U.S. Appl. No. 15/882,512, filed Jan. 29, 2018, dated Jan. 28, 2021, 20 pgs.

Furcoiu, Aurelian Ioan; Office Action for Chinese patent application No. 201880026432.6, file Mar. 21, 2018, dated Nov. 4, 2020, 13 pgs.

Furcoiu, Aurelian Ioan; Non-Final Office Action for U.S. Appl. No. 16/854,369, filed Apr. 21, 2020, dated Sep. 22, 2021, 51 pgs.

Furcoiu, Aurelian Ioan; Supplemental Notice of Allowance for U.S. Appl. No. 15/882,512, filed Jan. 29, 2018, dated Sep. 1, 2021, 11 pgs.

Furcoiu, Aurelian Ioan; Notice of Allowance for U.S. Appl. No. 16/242,059, filed Jan. 8, 2019, dated Aug. 13, 2021, 18 pgs.

Furcoiu, Aurelian Ioan; Supplemental Notice of Allowance for U.S Patent Application No. 16/242,059, filed Jan. 8, 2019, dated Sep. 1, 2021, 7 pgs.

Furcoiu, Aurelian Ioan; Notice of Allowance for U.S. Appl. No. 15/908,096, filed Feb. 28, 2018, dated Aug. 16, 2021, 12 pgs.

Furcoiu, Aurelian Ioan; Advisory Action for U.S. Appl. No. 16/109,204, filed Aug. 22, 2018, dated Aug. 19, 2021, 10 pgs.

Furcoiu, Aurelian Ioan; Non-Final Office Action for U.S. Appl. No. 16/109,204, filed Aug. 22, 2018, dated Sep. 23, 2021, 19 pgs.

Furcoiu, Aurelian Ioan; Supplemental Notice of Allowance for U.S. Appl. No. 16/266,835, filed Feb. 4, 2019, dated Oct. 6, 2021, 7 pgs.

Furcoiu, Aurelian Ioan; Supplemental Notice of Allowance for U.S. Appl. No. 16/266,835, filed Feb. 4, 2019, dated Aug. 17, 2021, 7 pgs.

Furcoiu, Aurelian Ioan; Extended European Search Report for patent application No. 18787054.8, filed Mar. 21, 2018, dated Mar. 17, 2021 (received by European counsel for Applicant on Aug. 20, 2021), 9 pgs.

Furcoiu, Aurelian Ioan; Notice of Allowance for U.S. Appl. No. 16/575,013, filed Sep. 18, 2019, dated Nov. 9, 2021, 13 pgs.

Furcoiu, Aurelian Ioan; Corrected Notice of Allowance for U.S. Appl. No. 15/908,096, filed Feb. 28, 2018, dated Nov. 1, 2021, 8 pgs.

Furcoiu, Aurelian Ioan; Corrected Notice of Allowance for U.S. Appl. No. 15/908,096, filed Feb. 28, 2018, dated Nov. 10, 2021, 7 pgs.

Furcoiu, Aurelian Ioan; Supplemental Notice of Allowance for U.S. Appl. No. 15/966,796, filed Apr. 30, 2018, dated Nov. 10, 2021, 6 pgs.

Mitchell, Timothy; Non-Final Office Action for U.S. Appl. No. 16/517,129, filed Jul. 19, 2019, dated Dec. 1, 2021, 71 pgs.

Furcoiu, Aurelian Ioan; Office Action for Chinese patent application No. 201880026432.6, file Mar. 21, 2018, dated Nov. 10, 2021, 18 pgs.

Furcoiu, Aurelian Ioan; Extended European Search Report for application No. 19796735.9, filed Apr. 19, 2019, dated Jan. 4, 2022, 10 pgs.

Furcoiu, Aurelian Ioan; Final Office Action for U.S. Appl. No. 16/109,204, filed Aug. 22, 2018, dated Feb. 1, 2022, 27 pgs.

Mitchell, Timothy J.; International Preliminary Report on Patentability for PCT Application No. PCT/US19/65337, filed Dec. 10, 2019, dated Feb. 3, 2022, 8 pgs.

\* cited by examiner

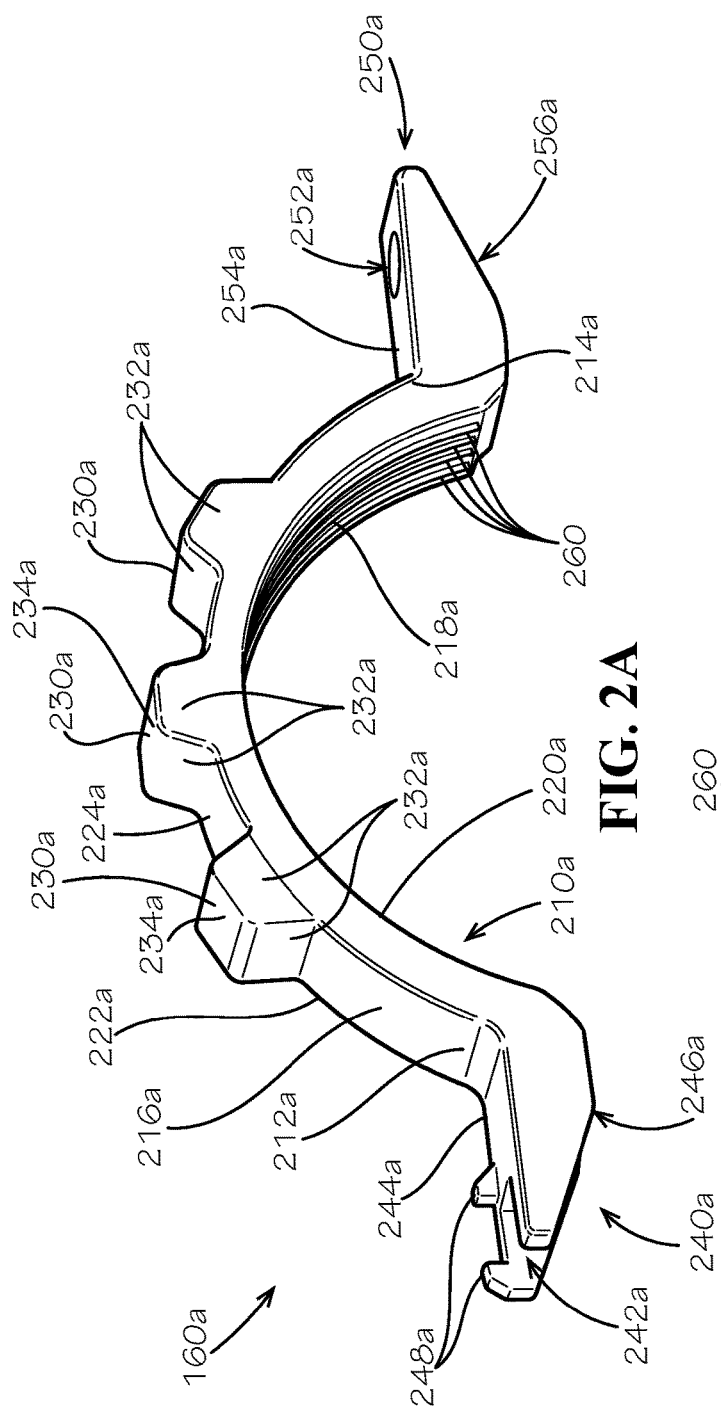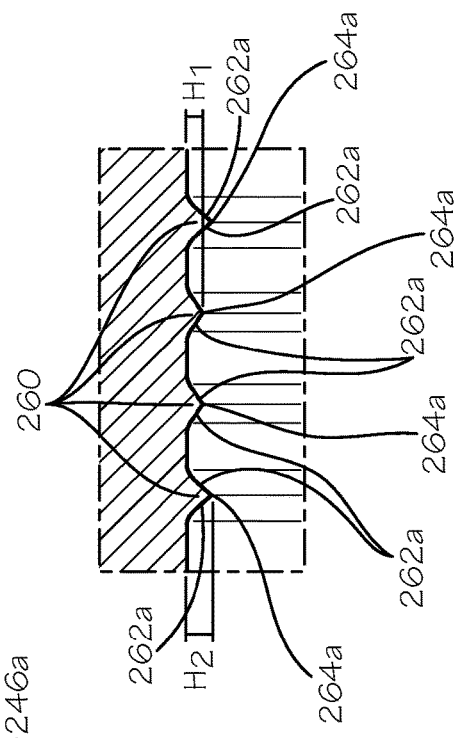
FIG. 2A
FIG. 2B

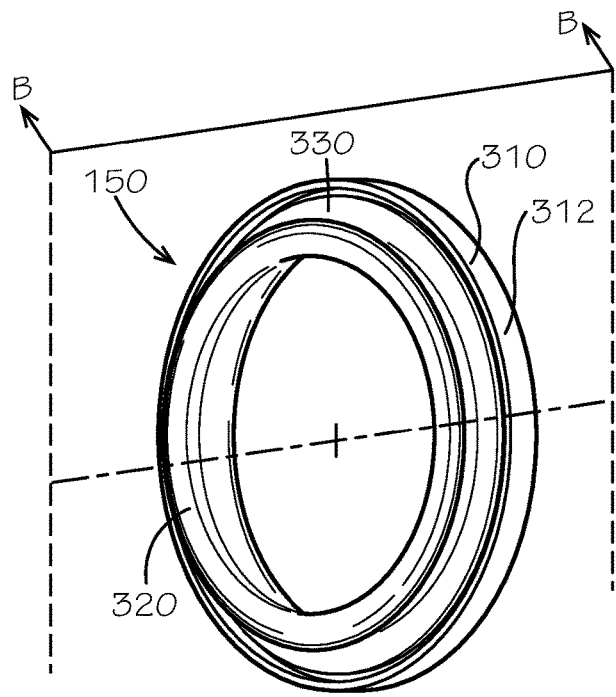
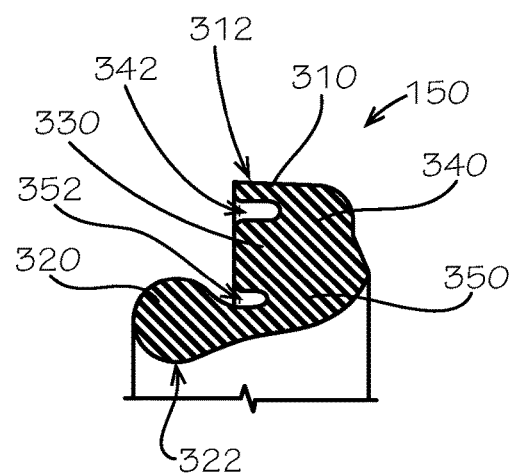
FIG. 3A  FIG. 3B
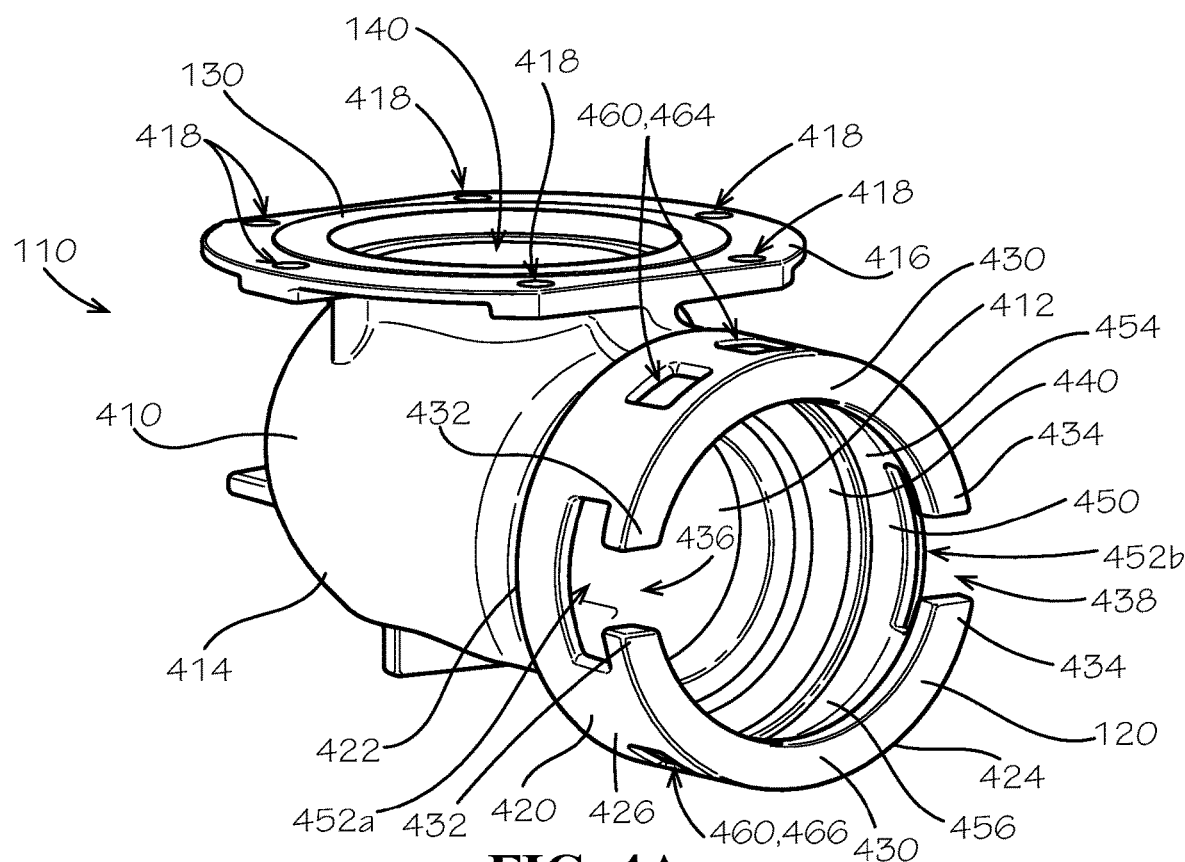
FIG. 4A

HYDRANT SHOE ASSEMBLY

CROSS-REFERENCE TO RELATED APPLICATION

The present application is a continuation of U.S. application Ser. No. 16/121,132, filed Sep. 4, 2018, which is hereby incorporated by reference herein in its entirety.

TECHNICAL FIELD

This disclosure relates to hydrant shoe assemblies. More specifically, this disclosure relates to a hydrant shoe assembly comprising a harness for restraining a pipe.

BACKGROUND

Hydrant shoes can be positioned between a water supply (e.g., a water pipeline) and a fire hydrant to facilitate water flow from the water supply to the fire hydrant. Hydrant shoes commonly comprise an inlet end connected to the pipeline and outlet end connected to the fire hydrant. For dry barrel fire hydrants, a main valve can be located within the outlet end for controlling water flow into the fire hydrant. The main valve can be connected to an operating nut in a bonnet of the dry barrel fire hydrant by a stem and the main valve can be raised and lowered in the hydrant shoe to open and close the main valve by turning the operating nut.

Commonly, hydrant shoes are connected to the pipeline by a mechanical joint standard connection. Often, the mechanical joint connection must be purchased separately from the hydrant shoe. Furthermore, current mechanical joint connections can require multiple components, and the installation can be time-consuming and labor-intensive.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts off the disclosure as an introduction to the following complete and extensive detailed description.

Disclosed is a harness for a hydrant shoe assembly, the harness comprising an arcuate spine, the spine defining a first end, a second end, and a middle region therebetween, the spine defining an inner surface and an outer surface, the spine comprising a first protuberance extending from the outer surface and a first rib extending from the inner surface; a first fastener lug extending from the first end of the spine; and a second fastener lug extending from the second end of the spine.

Also disclosed is a hydrant shoe assembly comprising a shoe body defining an outer surface and an inner surface, the inner surface defining a void, the void defining an inlet end and an outlet end, a first opening extending from the inner surface to the outer surface, a second opening extending from the inner surface to the outer surface; a gasket received in the void, the gasket defining an outer sealing surface and an inner sealing surface, the outer sealing surface engaging the inner surface of the shoe body; a first harness received in the void, the first harness comprises a first protuberance extending radially outward, the first protuberance received in the first opening; and a second harness received in the void, the second harness comprising a second protuberance extending radially outward, the second protuberance received in the second opening.

Also disclosed is a method for assembling a hydrant shoe assembly, the method comprising providing a shoe body, the shoe body defining an outer surface and an inner surface, the inner surface defining a void, a first opening extending from the outer surface to the inner surface, a second opening extending from the outer surface to the inner surface; inserting a gasket into the void; engaging an outer sealing surface of the gasket with the inner surface of the shoe body; inserting a first harness into the void such that a first protuberance of the first harness extends through the first opening in the shoe body; and inserting a second harness into the void such that a second protuberance of the second harness extends through the second opening in the shoe body.

A hydrant shoe assembly is disclosed, the hydrant shoe assembly comprising a shoe body defining a shoe body outer surface and a shoe body inner surface, the shoe body inner surface defining a void, the void defining an inlet end and an outlet end, an opening extending from the shoe body inner surface to the shoe body outer surface, the opening oriented proximate to the inlet end; a harness received in the void, the harness defining a harness inner surface and a harness outer surface, a protuberance extending radially outward from harness outer surface, the protuberance engaging the opening to prohibit axial and rotational movement of the harness relative to the shoe body; and a pipe extending into the void through the inlet end, the harness inner surface engaging the pipe to restrain the pipe relative to the shoe body.

Additionally, a method for assembling a hydrant shoe assembly is disclosed, the method comprising providing a shoe body, the shoe body defining a shoe body outer surface and a shoe body inner surface, the shoe body inner surface defining a void, an opening extending from the shoe body outer surface to the shoe body inner surface; inserting a harness into the void; engaging a protuberance of the harness with the opening in the shoe body, the harness defining a harness inner surface and a harness outer surface, the protuberance extending from the harness outer surface; and engaging a pipe with the harness inner surface to restrain the pipe relative to the shoe body.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

FIG. 2A is a top perspective view of one of the harnesses of the hydrant shoe assembly of FIG. 1.

FIG. 2B is a close-up, cross-sectional view of ribs formed on the harness of FIG. 2A.

FIG. 3A is a perspective view of the gasket of the hydrant shoe assembly of FIG. 1.

FIG. 3B is a cross-sectional view of the gasket of FIG. 3A, taken along line B-B of FIG. 3A.

FIG. 4A is a top perspective view of the shoe body of the hydrant shoe assembly of FIG. 1.

DETAILED DESCRIPTION

Figure 1:
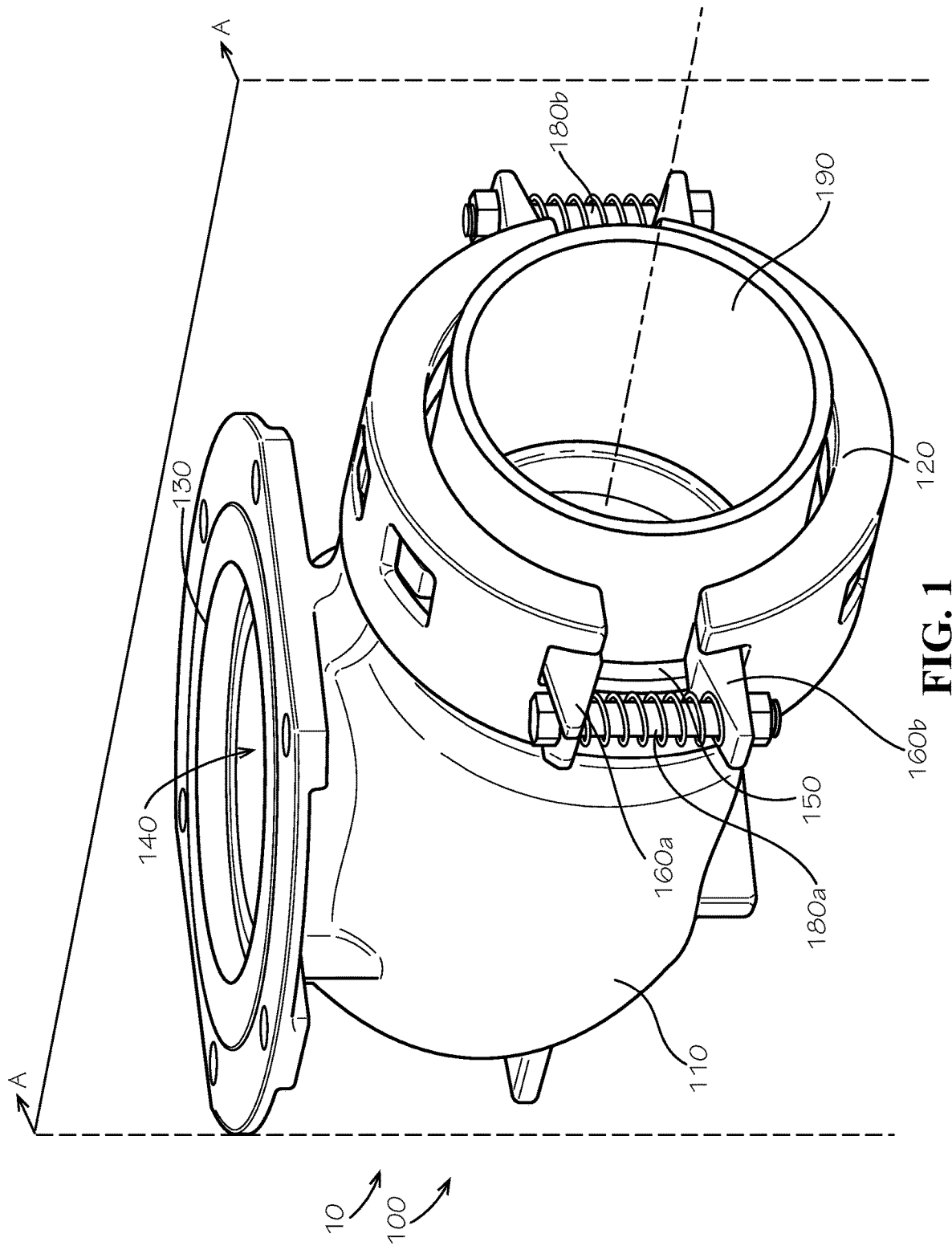
FIG. 1 is a top perspective view of a hydrant shoe assembly comprising a shoe body, a gasket, and a pair of harnesses, in accordance with one aspect of the present disclosure, wherein the hydrant shoe assembly is engaged with a pipe in a loosened configuration.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed in the present application is a shoe assembly and associated methods, systems, devices, and various apparatus. Example aspects of the shoe assembly can comprise a shoe body, a gasket, and a pair of harnesses. It would be understood by one of skill in the art that the disclosed shoe assembly is described in but a few exemplary aspects among many. No particular terminology or description should be considered limiting on the disclosure or the scope of any claims issuing therefrom.

FIG. 1 illustrates a first aspect of a shoe assembly 10 according to the present disclosure. Example aspects of the shoe assembly 10, such as the aspect depicted in FIG. 1, can be a hydrant shoe assembly 100 configured for use with a fire hydrant. In some aspects, the fire hydrant can be a dry barrel fire hydrant. Furthermore, in example aspects, the hydrant shoe assembly 100 can be in fluid communication with a drinking water supply. As such, in some aspects, some or all of the components of the hydrant shoe assembly 100 can be formed from NSF certified material that can be approved as safe for use in drinking-water applications. The hydrant shoe assembly 100 can be configured to facilitate the transport of water from the water supply to the fire hydrant. However, in other aspects, the shoe assembly 10 can be configured for use in applications other than fire hydrant systems. For example, the shoe assembly 10 can be configured for use with valves, tees, elbows, and various other fittings and piping components that can be subjected to a thrust force during operation.

As shown, the hydrant shoe assembly 100 can comprise a shoe body 110, a gasket 150, and an integrated restraint device. The restraint device can comprise a first harness 160a and a second harness 160b. Example aspects of the shoe body 110 can define the inlet end 120 and the outlet end 130. Furthermore, the shoe body 110 can define a void 140 extending from the inlet end 120 to the outlet end 130. The gasket 150 and the first and second harnesses 160a,160b can be disposed within the void 140. In examples aspects, the hydrant shoe assembly 100 can be connected to a fire hydrant (not shown) at the outlet end 130 and to a water supply, such as a pipe 190 of a water pipeline, at the inlet end 120. Only a small section of a pipe 190 is shown in FIG. 1 for illustration purposes only. For example, the first and second harnesses 160a,160b can be configured to grip the pipe 190 and to restrain the pipe from axial and rotational movement. Water from the water supply can flow through the void 140 in the hydrant shoe assembly 100 to the fire hydrant, as needed. Example aspects of the fire hydrant (not shown), including aspects in which the fire hydrant is a dry barrel fire hydrant, can comprise a main valve (not shown) that can be located within void 140 proximate to the outlet end 130 for selectively controlling water flow into the fire hydrant.

Figure 10:
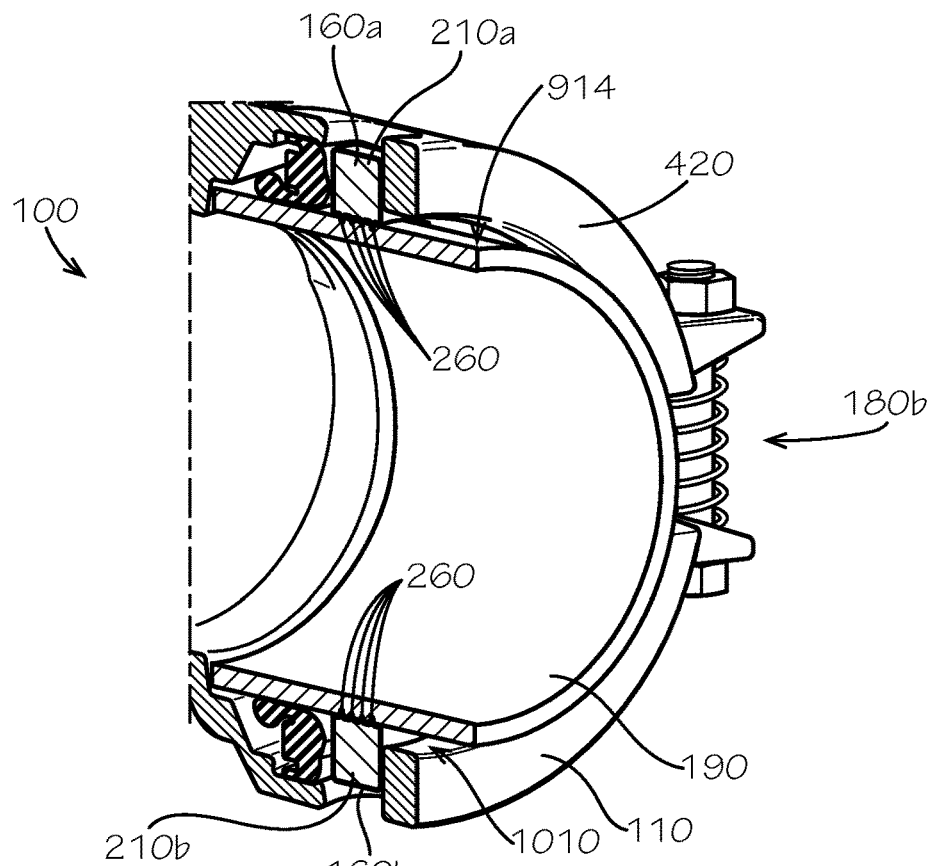
FIG. 10 illustrates a perspective cross-sectional view of the hydrant shoe assembly of FIG. 1 engaged with the pipe of FIG. 1 in a tightened configuration, taken along line A-A of FIG. 1.

According to example aspects, one or more fasteners 180 can couple the first harness 160a to the second harness. For example, the hydrant shoe assembly 100 can comprise a first fastener 180a and a second fastener 180b. Furthermore, example aspects of the hydrant shoe assembly 100 can be selectively configurable in a loosened configuration, as shown in FIG. 1, wherein the fasteners 180 can be loosened, and a tightened configuration, as shown in FIG. 10, wherein the fasteners 180 can be tightened. In the loosened configuration, the first and second harnesses 160a,160b can be disengaged from the pipe 190, and in the tightened configuration, the first and second harnesses 160a,160b can engage the pipe 190, as will be described in further detail below.

FIG. 2A illustrates an example aspect of the first harness 160a. The second harness 160b can be substantially the same as the first harness 160a. Example aspects of the first and second harnesses 160a, 160b can be formed from metal material, such as, for example, ductile iron. In other aspects, the first and second harnesses 160a, 160b can be formed from a plastic material, a composite material, a ceramic material, another metal material such as steel or cast iron, or any other suitable material. Some example aspects of the first and second harnesses 160a, 160b can be heat treated to a desired hardness. Other example aspects can be coated in a corrosion-resistant coating and case hardened to a desired hardness. As shown, the first harness 160a can comprise a generally arcuate spine 210a extending between a first end 212a and a second end 214a. The spine 210a can define an outer surface 216a and an inner surface 218a. The spine 210a further can define a front side 220a and an opposite rear side 222a. As shown, the first harness 160a can comprise one or more protuberances 230a extending from the outer surface 216a of the spine 210a. In example aspects, the protuberances 230a can span a width of the spine 210a from the front side 220a of the spine 210a to the rear side 222a of the spine 210a, as shown. In example aspects, each of the protuberances 230a can substantially define a trapezoidal prism. For example, as shown in the depicted embodiment, each protuberance 230a can define four sidewalls 232a (not all four sidewalls are visible) extending from the outer surface 216a of the spine 210a and a substantially flat top surface 234a distal from the spine 210a. In other aspect, the protuberances 230a can define any number of sidewalls 232a. Furthermore, in other aspects, the protuberances 230a can define any suitable shape, including, but not limited to, a triangular prism, a hemisphere, and a rectangular prism.

In example aspects, a thickness of the spine 210a can taper from the first end 212a towards a middle region 224a of the spine 210a, and from the second end 214a towards the middle region 224a, such that the thickness of the spine 210a at the middle region 224a of the spine 210a is less than the thickness of the spine 210a at either of the first end 212a and second end 214a. In example aspects, the thickness of the spine 210a can be defined as the distance between the outer surface 216a and inner surface 218a. The tapered thickness of the spine 210a can allow for flexibility of the spine 210a, as will be described in further detail below.

Furthermore, a first fastener lug 240a can extend from the first end 212a of the spine 210a, and a second fastener lug 250a can extend from the second end 214a of the spine 210a. As shown, the first fastener lug 240a can define an open-sided channel 242a extending from a top surface 244a of the first fastener lug 240a to a bottom surface 246a of the first fastener lug 240a. The first fastener lug 240a can further define a pair of spaced-apart positioning tabs 248a extending from the top surface 244a. The second fastener lug 250a can define a hole 252a extending from a top surface 254a thereof to a bottom surface 256a thereof.

In example aspects, the spine 210a can comprise one or more elongated ribs 260 extending from the inner surface 218a. Each of the ribs 260 can extend from the first end 212a of the spine 210a to the second end 214a. In some aspects, such as the aspect depicted in FIG. 2A, the spine 210a can define a series of spaced-apart ribs 260 substantially spanning a width of the spine 210a from the front side 220a to the rear side 222a. The depicted aspect illustrates four ribs 260; however, other aspects can comprise more or fewer ribs 260. Furthermore, other aspects can define another suitable orientation of the ribs 260 on the inner surface 218a of the spine 210a.

FIG. 2B illustrates a close-up, cross-sectional view of the ribs 260 on the inner surface 218a of the spine 210a. Example aspects of the ribs 260 can each define a substantially triangular cross-sectional shape. For example, as shown, each of the ribs 260 can define a pair of opposing side surfaces 262a extending from the inner surface 218a of the spine 210a and tapering to an apex 264a distal from the inner surface 218a. However, in other aspects, the ribs 260 can define any other suitable cross-sectional shape, including, but not limited to, pentagonal, trapezoidal, and semi-circular. Moreover, example aspects of the ribs 260 can extend to varying heights away from the inner surface 218a of the spine 210a. For example, as illustrated, some of the ribs 260 can extend to a height of H1 and some of the ribs 260 can extend to a height of H2, wherein H1 is less than H2. However, in other aspects, the ribs 260 can extend to a uniform height. In the current aspect, two inner ribs 260 define a height of H1 and two outer ribs 260 define a height of H2. According to other aspects, as opposed to ribs 260, the inner surface 218a of the spine 210a can be a substantially rough surface or can define one or more projections suitable for increasing the friction between the first harness 160a and the pipe 190 (shown in FIG. 1) to overcome internal thrust forces and restrain the pipe 190 during operation.

FIG. 3A illustrates a perspective view of an example aspect of the gasket 150, and FIG. 3B illustrates a cross-sectional view of the gasket 150 taken along line B-B in FIG. 3A. Example aspects of the gasket 150 can comprise an outer sealing ring 310, an inner sealing ring 320, and a central ring 330 therebetween. A first connecting portion 340 can connect the outer sealing ring 310 to the central ring 330. Furthermore, a first annular groove 342 can be defined between the outer sealing ring 310 and the central ring 330. Moreover, a second connecting portion 350 can connect the inner sealing ring 320 to the central ring 330, and a second annular groove 352 can be defined between the inner sealing ring 320 and the central ring 330. Example aspects of the outer sealing ring 310 can define a substantially rectangular cross-sectional shape, as shown, and example aspects of the inner sealing real 320 can define a substantially circular cross-sectional shape, as shown. Furthermore, the outer sealing ring 310 can define an outer sealing surface 312 and the inner sealing ring 320 can define an inner sealing surface 322. Example aspects of the gasket 150 can be formed from any suitable material, including, but not limited to, polyurethane, TPU (thermoplastic polyurethane), TPE (thermoplastic elastomer), nylon, polypropylene, PVA (polyvinyl alcohol), additive manufacturing materials (e.g., titanium, steel, aluminum, copper), rubbers, sealants such as anaerobic sealants, glues, membranes, and resins. In example aspects, the gasket 150 can be formed from a compressible material.

Figure 4B:
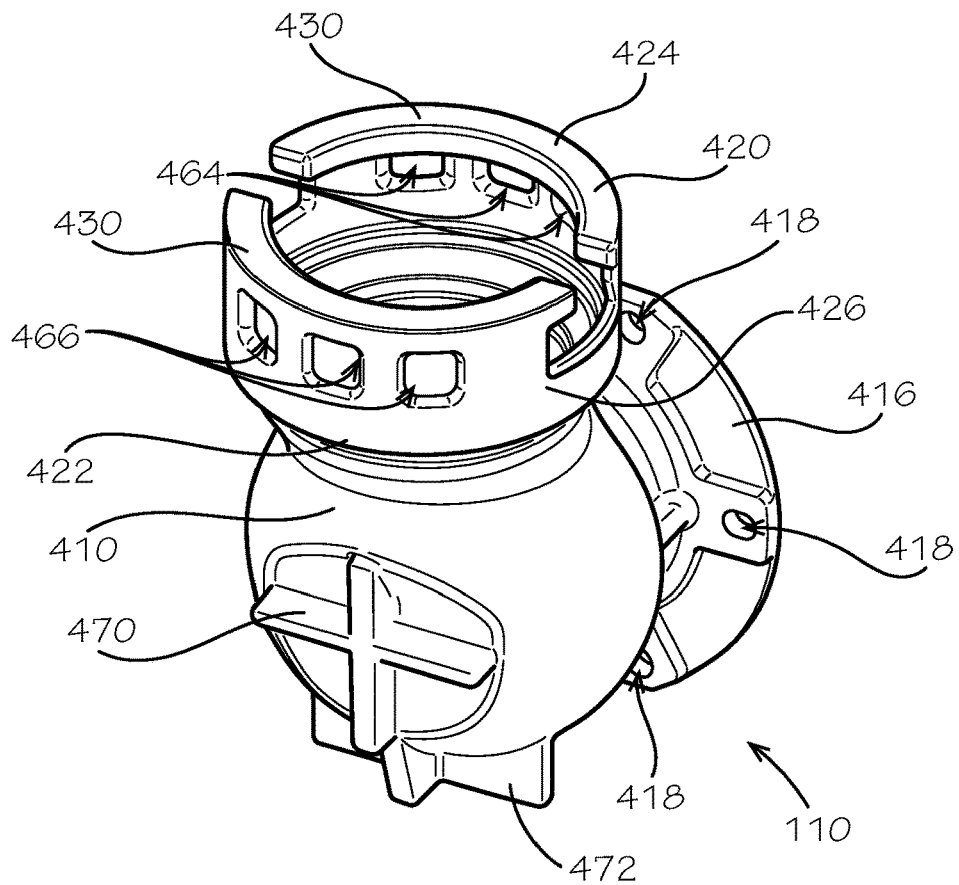
FIG. 4B is a bottom perspective view of the shoe body of FIG. 4A.

FIGS. 4A and 4B illustrates an example aspect of the shoe body 110. Example aspects of the shoe body 110 can be formed from a metal material, such as, for example, ductile iron. In other aspects, the shoe body 110 can be formed from a plastic material, another metal material such as steel, cast iron, ductile iron, bronze, or any other suitable material. As shown, the shoe body 110 can comprise an outer surface 410 and an inner surface 412. As described above, the shoe body 110 can define the inlet end 120 and outlet end 130 of the hydrant shoe assembly 100. Furthermore, the inner surface 412 of the shoe body 110 can define the void 140 extending between the inlet end 120 and outlet end 130. As shown in FIG. 4A, in some aspects, the shoe body 110 can define a generally L-shaped structure, such that a bend 414 is formed between the inlet end 120 and the outlet end 130. The bend 414 can define a substantially right angle, as shown, or any other suitable angle. As such, in the depicted example aspect, the inlet end 120 of the shoe body 110 can be oriented approximately perpendicular to the outlet end 130 of the shoe body 110. However, in other aspects, the shoe body 110 can define a substantially straight structure, such that the inlet end 120 can be substantially parallel to the outlet end 130, or can define any other suitable configuration for a shoe body 110 that is known in the art.

Example aspects of the outlet end 130 of the shoe body 110 can define an annular mounting flange 416, as shown. The annular mounting flange 416 can be mounted to piece of piping equipment, such as, for example, a fire hydrant, such as a riser pipe of the fire hydrant, or any other suitable piece of piping equipment known in the art. In example aspects, the annular mounting flange 416 can define mounting apertures 418 extending therethrough. The mounting apertures 418 can be configured to receive a fastener (not shown) for coupling the hydrant shoe assembly 100 to the fire hydrant or other equipment.

In example aspects, as shown, the shoe body 110 can comprise a cylindrical ring 420 formed proximate the inlet end 120 of the shoe body 110. Example aspects of the cylindrical ring 420 can define portions of the outer surface 410 and inner surface 412 of the shoe body 110, and as such, the void 140 can extend through the cylindrical ring 420. The cylindrical ring 420 can further define a first end 422 proximate the bend 414 of the shoe body 110, an opposite second end 424 at the inlet end 120 of the shoe body 110, and a central region 426 extending therebetween. The first end 422 of the cylindrical ring 420 can define a pair of opposing accurate ridges 430 extending radially inward from the cylindrical ring 420. Each of the arcuate shoe ridges 430 can define a first end 432, respectively, and an opposite second end 434, respectively. The first ends 432 of the arcuate shoe ridges 430 can be spaced from one another such that a gap 436 is formed therebetween. Similarly, the second ends 434 of the arcuate shoe ridges 430 can be spaced from one another such that a gap 438 is formed therebetween.

According to example aspects, the inner surface 412 of the cylindrical ring 420 can define a gasket channel 440 proximate the first end 422 for receiving the gasket (gasket shown in FIG. 1). The inner surface 412 further can define a harness channel 450 formed proximate the arcuate shoe ridges 430 for receiving the first and second harnesses 160a, 160b (first and second harnesses 160a, 160b shown in FIG. 1). Example aspects of the harness channel 450 can define opposing slots 452a,b extending from the inner surface 412 of the shoe body 110 to the outer surface 410 of the shoe body. The opposing slots 452a,b can define an upper portion 454 of the harness channel 450 extending therebetween and a lower portion 456 of the harness channel 450 extending therebetween. According to example aspects, the slot 452a can be configured to receive the first fastener lug 240a of the first harness 160a and second fastener lug 250b of the second harness 160b therethrough. Similarly, the slot 452b can be configured to receive the second fastener lug 250a of the first harness 160a and the first fastener lug 240b of the second harness 160b therethrough. Furthermore, according to example aspects, the slot 452a can be connected to the gap 436 and the slot 452b can be connected to the gap 438 to allow for placement of the harnesses 160a,b in the slots 452a,b respectively. Example aspects of each slot 452a,b can define a height greater than a height of the corresponding gap 436,438, as shown.

Optionally, one or more openings 460 can be formed in the harness channel 450, as shown. According to example aspects, as shown in FIG. 4B, three upper openings 464 can be formed in the upper portion 454 of the harness channel 450, and three lower openings 466 can be formed in the lower portion 456 of the harness channel 450. The upper openings 464 and lower openings 466 can, in example aspects, extend from the inner surface 412 of the cylindrical ring 420 to the outer surface 410 of the cylindrical ring 420. In example aspects, the number of upper openings 464 can correspond to the number of protuberances 230a on the first harness 160a, and the number of lower openings 466 can correspond to the number of protuberances 230*b* on the second harness 160*b*. However, in other aspects, the harness channel 450 can define more or fewer upper openings 464 and/or lower openings 466. Furthermore, in other aspects, the harness channel 450 can define recesses formed on the inner surface 412, as opposed to openings 460, which may not fully extend to the outer surface 410 of the cylindrical ring 420.

Furthermore, as shown in FIG. 4B, the shoe body 110 can comprise a first cross-shaped projection 470 and a second cross-shaped projection 472 extending from the outer surface 410 of the shoe body 110. The first and second projections 470,472 can be used to place the hydrant shoe assembly 100 on a flat surface for storage and/or transportation. Furthermore, the first and second projections 470, 472 can aid in setting the shoe in place during assembly to the water supply and fire hydrant. The first and second projections 470,472 can also be used for bracing and strengthening the hydrant shoe assembly 100 during operation.

Figure 5:
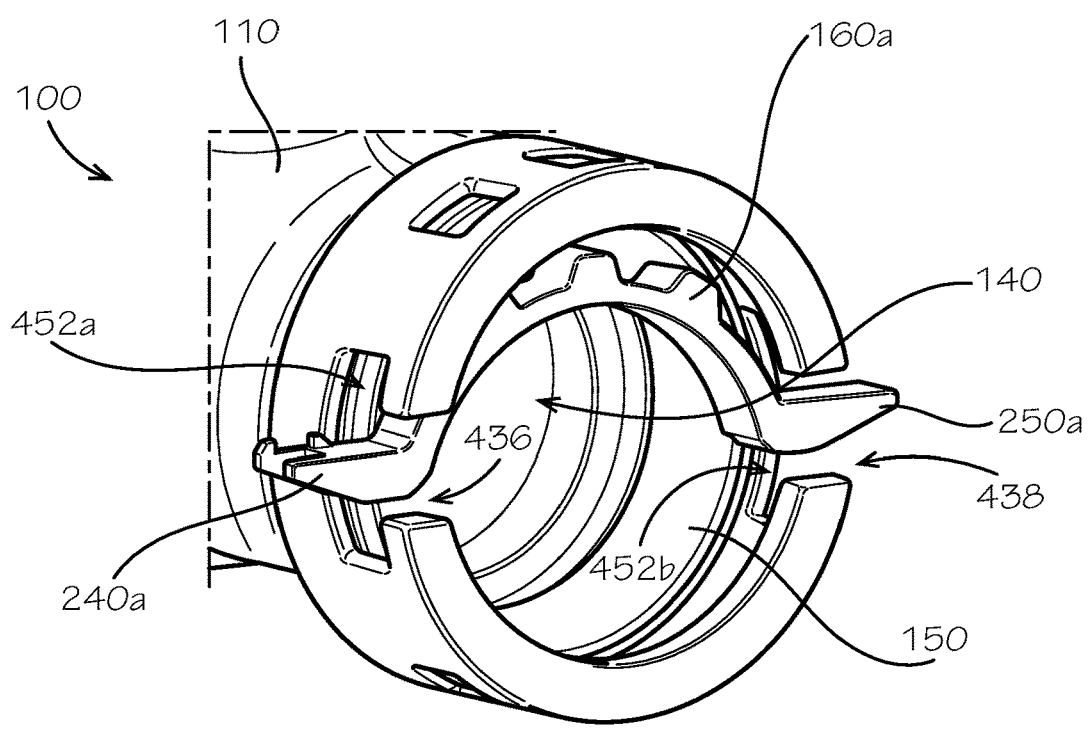
FIG. 5 illustrates a first step in a method of assembling the hydrant shoe assembly of FIG. 1, in accordance with one aspect of the present disclosure.

FIGS. 5-8 illustrate an aspect of a method of assembling the hydrant shoe assembly 100. As shown in FIG. 5, the method can comprising inserting the gasket 150 into the void 140 and receiving the gasket 150 in the gasket channel 440 (shown in FIG. 4). In example aspects, the gasket 150 can be compressed by a compression force for easy insertion into void 140. For example, the gasket 150 can be compressed manually, such as by a hand, or mechanically, such as by a compression mechanism. When the gasket 150 is properly positioned within the shoe body 110, the method can comprise releasing the compression force and expanding the gasket 150. Expanding the gasket 150 can comprise pressing the outer sealing surface 312 (shown in FIG. 3) of the gasket 150 against the inner surface 412 (shown in FIG. 4) of the gasket channel 440. The outer sealing surface 312 can create a waterproof seal between the gasket 150 and the hydrant shoe assembly 100. A next step, also shown in FIG. 5, can comprise inserting the first harness 160*a* into the void 140 by passing the first and second fastener lugs 240*a*,250*a* through the corresponding gaps 436,438, respectively, and into the corresponding slots 452*a*,452*b*, respectively.

Figure 6:
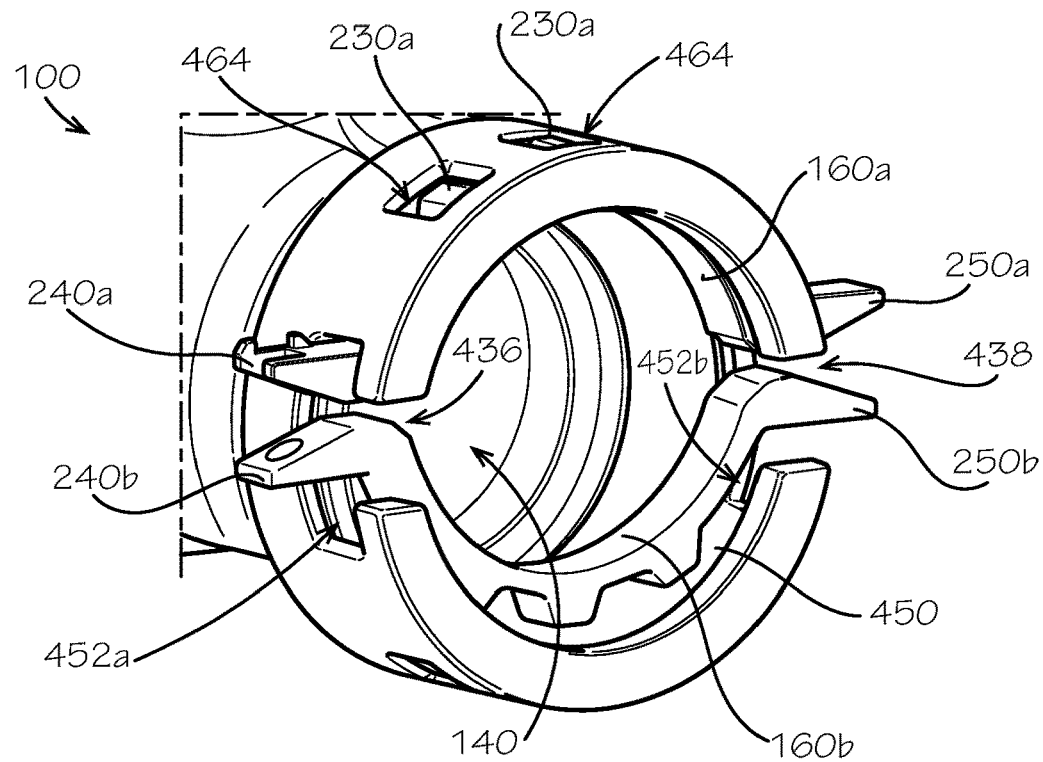
FIG. 6 illustrates a second step in a method of assembling the hydrant shoe assembly of FIG. 1.

As shown in FIG. 6, with the first fastener lug 240*a* and second fastener lug 250*a* of the first harness 160*a* received in the corresponding slots 452*a*,452*b*, the method can further comprise receiving the first harness 160*a* within the upper portion 454 (shown in FIG. 4) of the harness channel 450 and extending the protuberances 230*a* through the corresponding upper openings 464. A next step in the method can comprise inserting the second harness 160*b* into the void 140 by passing the first and second fastener lugs 240*b*,250*b* through the corresponding gaps 438,436, respectively, and into the corresponding slots 452*b*,452*a*, respectively.

Figure 7:
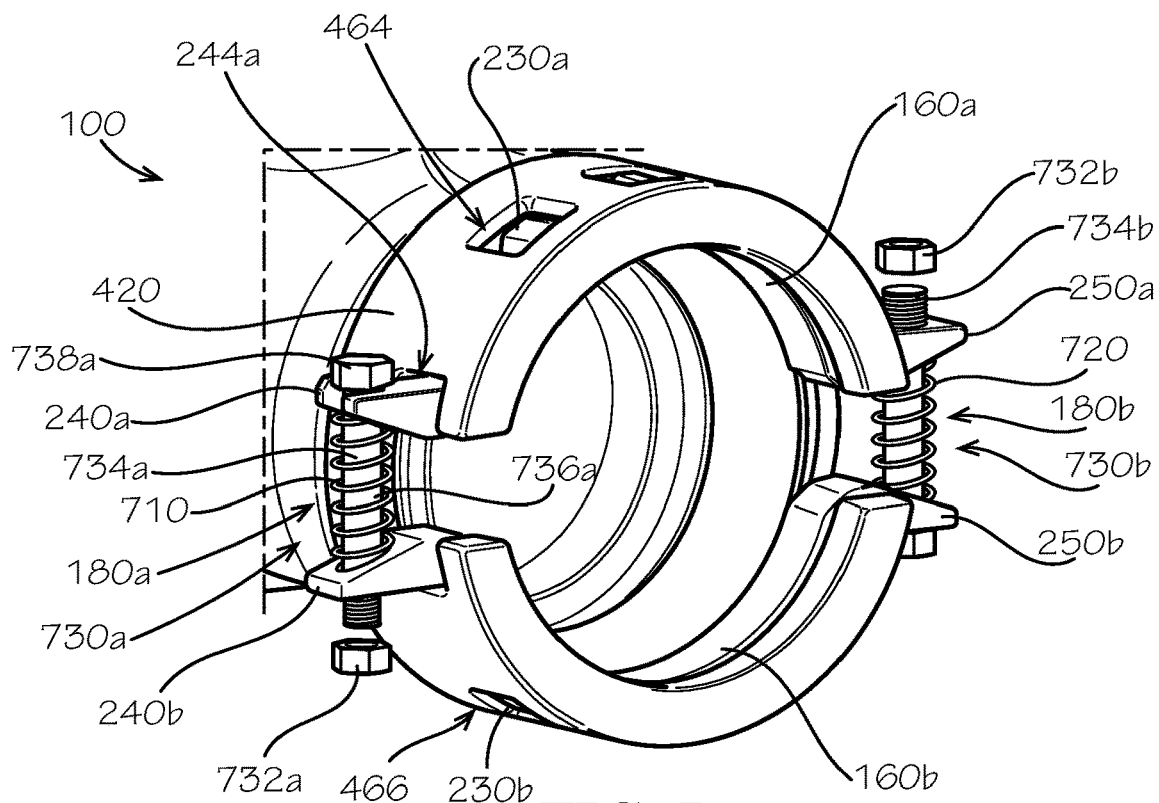
FIG. 7 illustrates a third step in a method of assembling the hydrant shoe assembly of FIG. 1.

As shown in FIG. 7, with the first fastener lug 240*b* and second fastener lug 250*b* of the second harness 160*b* received in the slots 452*b*,452*a* (shown in FIG. 4), respectively, the method can comprise receiving the second harness 160*b* within the lower portion 456 of the harness channel 450 (harness channel 450 shown in FIG. 4), with the protuberances 230*b* extending through the corresponding lower openings 466. The extension of the protuberances 230*a* of the first harness 160*a* through the upper openings 464 and the extension of the protuberances 230*b* of the second harness 160*b* through the lower openings 466 can aid in prohibiting axial and rotational movement of the first and second harnesses 160*a*,160*b* relative to the cylindrical ring 420. Furthermore, the positioning of the first fastener lugs 240*a,b* and second fastener lugs 250*a,b* of the first and second harnesses 160*a*,160*b* in the slots 452*a,b* can further aid in prohibiting axial movement of the first and second harnesses 160*a*,160*b* relative to the cylindrical ring 420.

Also shown in FIG. 7, the method can comprise positioning a first spring 710 between the first fastener lug 240*a* of the first harness 160*a* and the second fastener lug 250*b* of the second harness 160*b*. The method can also comprise positioning a second spring 720 between the second fastener lug 250*a* of the first harness 160*a* and the first fastener lug 240*b* of the second harness 160*b*. As shown, in example aspects, each of the first spring 710 and second spring 720 can be a compression spring. Moreover, each of the first spring 710 and second spring 720 can be configured to bias the first harness 160*a* away from the second harness 160*b*.

Example aspects of the method can further comprise inserting the first fastener 180*a* through the channel 242*a* (shown in FIG. 2) of the first fastener lug 240*a*, through the first spring 710, and through the hole 252*b* (shown in FIG. 2) of the second fastener lug 250*b*. Another step of the method can be inserting the second fastener 180*b* through the channel 242*b* (shown in FIG. 2) of the first fastener lug 240*b*, through the second spring 720, and through the hole 252*a* (shown in FIG. 2) of the second fastener lug 250*a*.

As shown, in example aspects, each of the first fastener 180*a* and second fastener 180*a* can be a nut and bolt assembly 730*a,b*, respectively. Each of the nut and bolt assemblies 730*a,b* can comprise a nut 732*a,b* and a bolt 734*a,b*. Referring to the first fastener 180*a*, according to example aspects, a shank 736*a* of the bolt 734*a* can extend through the corresponding first fastener lug 240*a*, first spring 710, and second fastener lug 250*b*, respectively. A head 738*a* of the bolt 734*a* can engage the top surface 244*a* of the corresponding first fastener lug 240*a*. Furthermore, in example aspects, the head 738*a* of the bolt 734*a* can be positioned between the corresponding positioning tabs 248*a* (shown in FIG. 2) on the first fastener lug 240*a* to prevent lateral and rotational movement of the bolt 734*a*. The bolt 734*b* of the second fastener 160*b* can engage the first fastener lug 240*b*, second spring 720, and second fastener lug 250*a* in the same way. Note, in FIG. 7, the nuts 732*a,b* are shown detached from the corresponding bolts 734*a,b*. In other aspects, the first and second fasteners 180*a,b* can be any other suitable fastener known in the art.

Figure 8:
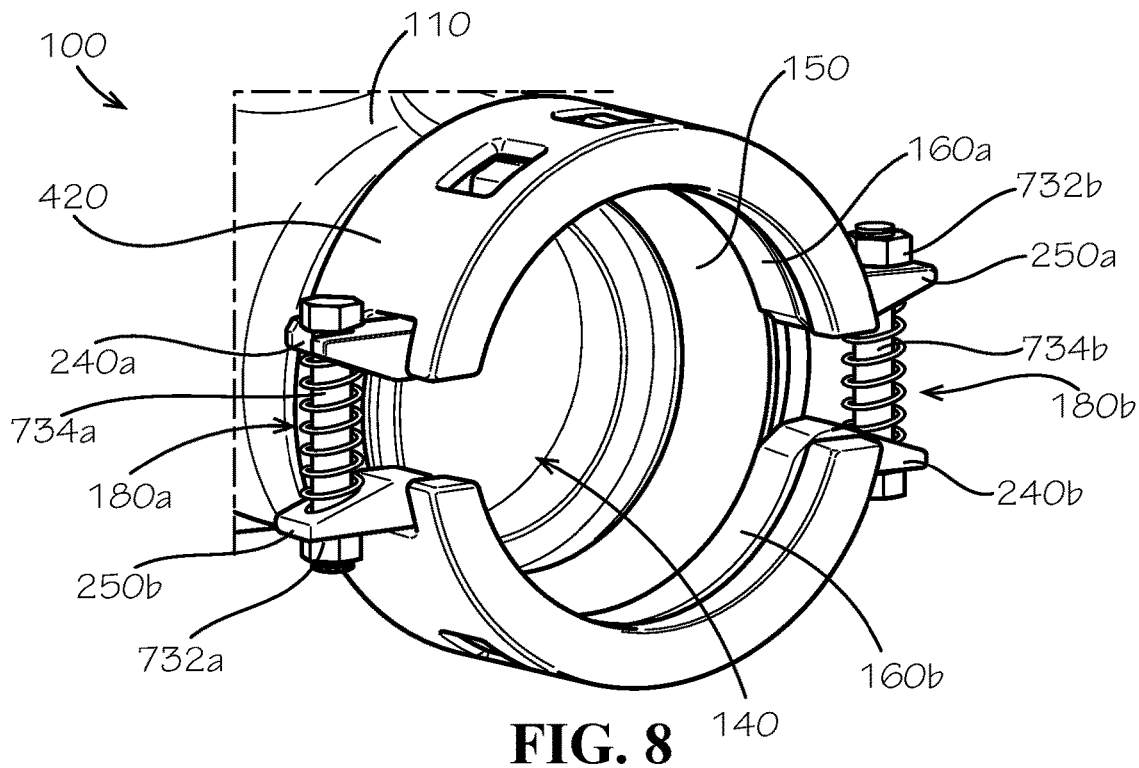
FIG. 8 illustrates a fourth step in a method of assembling the hydrant shoe assembly of FIG. 1.

FIG. 8 illustrates another step of the method, according to example aspects. As shown, the method can comprise coupling the first harness 160*a* to the second harness 160*b*. Coupling the first harness 160*a* to the second harness 160*b* can comprise coupling the first fastener lug 240*a* to the second fastener lug 250*b* with the first fastener 180*a* and coupling the first fastener lug 240*b* to the second fastener lug 250*a* with the second fastener 180*b*. In the depicted aspect, coupling the first fastener lug 240*a* to the second fastener lug 250*b* can comprise screwing the nut 732*a* onto the bolt 734*a*, and coupling the first fastener lug 240*b* to the second fastener lug 250*a* can comprise screwing the nut 732*b* onto the bolt 734*b*. FIG. 8 illustrates the hydrant shoe assembly 100 in the loosened configuration, wherein the first fastener 180*a* and second fastener 180*b* are both loosened, i.e., the nuts 732*a,b* are only partially tightened onto the corresponding bolts 734*a,b*.

Figure 9A:
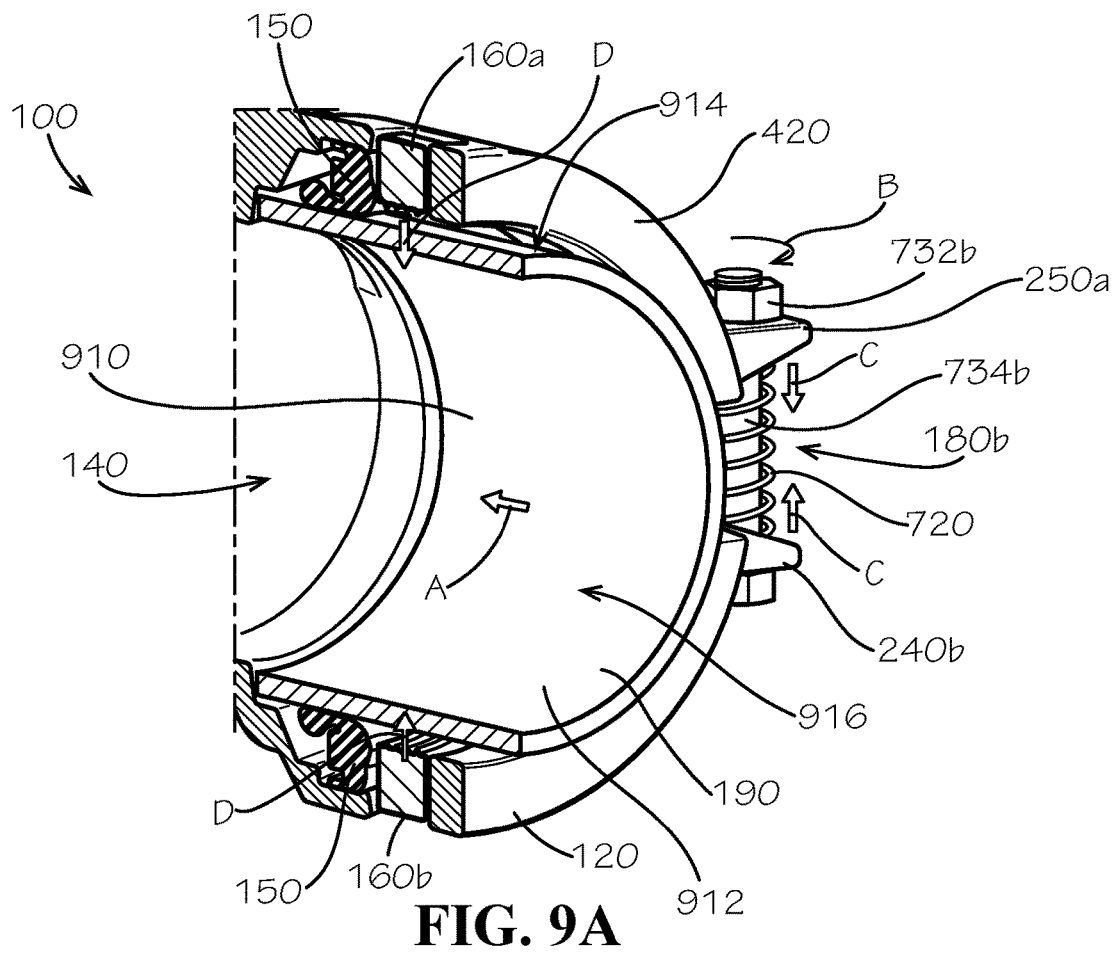
FIG. 9A illustrates a perspective cross-sectional view of the hydrant shoe assembly of FIG. 1 engaged with the pipe of FIG. 1 in the loosened configuration, taken along line A-A of FIG. 1.
Figure 9B:
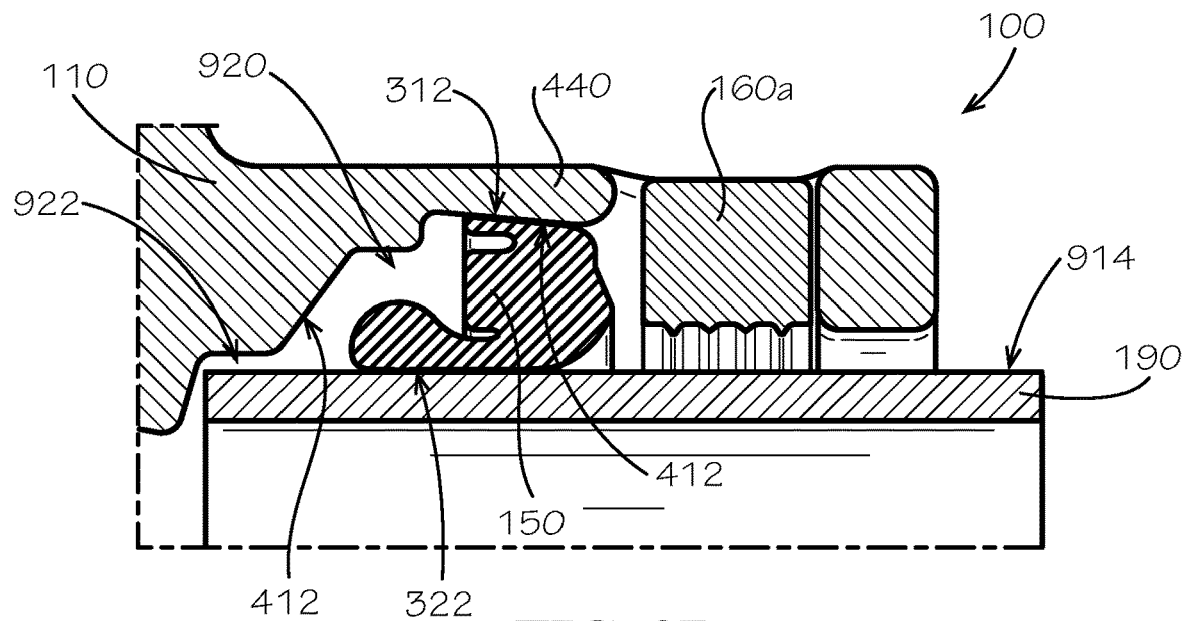
FIG. 9B is a close-up, cross-sectional view of the hydrant shoe assembly of FIG. 1 engaged with the pipe of FIG. 1 in the loosened configuration, taken along line A-A of FIG. 1.

As shown in FIGS. 9A-9B, and FIG. 10, a method of attaching the hydrant shoe assembly 100 to the pipe 190 is also provided. As shown in FIGS. 9A-9B, the method can comprise inserting an end 910 of the pipe 190 into the void 140 of the hydrant shoe assembly 100 at the inlet end 120, as indicated by the directional arrow A, and receiving the end 910 of the pipe 190 within the cylindrical ring 420. As described above, the first and second fasteners 180a,b (180a shown in FIG. 1) can be in the loosened configuration and the first and second springs 710,720 (first spring 710 shown in FIG. 7) can bias the first and second harnesses 160a,160b apart to allow for easy insertion of the pipe 190 into the void 140 and between the first and second harnesses 160a,160b.

In example aspects, the pipe 190 can define an inner surface 912 and an outer surface 914. The inner surface 912 of the pipe 190 can define a pipe void 916 in fluid communication with the void 140 of the hydrant shoe assembly 100. As shown in FIG. 9B, the method of attaching the hydrant shoe assembly 100 to the pipe 190 can further comprise engaging the inner sealing surface 322 of the gasket 150 with the outer surface 914 of the pipe 190 to form a liquid-tight-seal between the gasket 150 and the pipe 190. As shown, a chamber 920 can be defined by the gasket 150, the inner surface 412 of the shoe body 110, and the outer surface 914 of the pipe 190. Moreover, an access channel 922 extending between the void 140 and the chamber 920 can be defined by the pipe 190 and the inner surface 412 of the shoe body 110, as illustrated.

Referring back to FIG. 9A, the method further can comprise engaging the first and second harnesses 160a,160b with the pipe 190. Engaging the first and second harnesses 160a,160b with the pipe 190 can comprises tightening the first and second fasteners 180a,b. FIG. 9A illustrates an example aspect of tightening the second fastener 180b. According to example aspects, tightening the first fastener 180a can be substantially the same as tightening the second fastener 180b. As shown, example aspects of tightening the second fastener 180b can comprise further screwing the nut 732b onto the corresponding bolt 734b, as indicated by the rotational directional arrow B. As the second fastener 180b is tightened, the first fastener lug 240b and second fastener lug 250a can apply a compression force to the second spring 720, as indicated by directional arrows C, to compress the second spring 720 and to bring the first harness 160a and second harness 160b closer together, as indicated by directional arrow D. The first fastener 180a can be similarly tightened to compress the first spring 710 (shown in FIG. 7) and bring the first and second harnesses 160a,160b closer together. The first and second fasteners 180a,b can be tightened until the first and second harnesses 160a,160b engage the pipe 190 with a desired grip strength. Integrating the first and second harness 160a,160b into the hydrant shoe assembly 10 can eliminate the need to purchase a separate and costly restraint device, which can be labor-intensive and time-consuming to install.

FIG. 10 illustrates the hydrant shoe assembly 100 in the tightened configuration, wherein the first and second fasteners 180a,b (180a shown in FIG. 1) can be in the tightened configuration and the first and second harnesses 160a,160b can engage the pipe 190. Engaging the first and second harnesses 160a,160b with the pipe 190 can comprise engaging the ribs 260 ribs 260 of the first and second harnesses 160a,160b with the outer surface 914 of the pipe 190. In example aspects, the apex 264 (shown in FIG. 2) of each rib 260 can be pressed into the outer surface 914 of the pipe 190 to increase the grip strength between the first and second harnesses 160a,b and the pipe 190. The engagement of the ribs 260 with the pipe 190 can secure the pipe 190 to the hydrant shoe assembly 100 and prevent axial and rotational movement of the pipe 190 relative to the hydrant shoe assembly 100. The varying heights of the ribs 260 can aid in preventing pipe cracking by reducing the amount of stress on the pipe 190. For example, ribs 260 of a greater height can penetrate further into the pipe 190, raising the stress on the pipe 190 and potentially exceeding the pipe strength limit, which can result in pipe cracking or other damage. As such, ribs 260 of a lesser height can penetrate the pipe 190 less deeply and can reduce the stress on the pipe 190. As the fasteners 180a,b are tightened and the first and second harnesses 160a,160b engage the pipe 190, the tapered thickness of the spines 210a,b, as described above, can allow for deflection of the first and second harnesses 160a,160b, as necessary, to engage the ribs 260 further into the pipe 190 around the circumference of the pipe 190.

As shown in FIG. 10, with the first and second harnesses 160a,160b engaging and restraining the pipe 190, an annular gap 1010 can be formed between pipe 190 and the shoe body 110. The annular gap 1010 can allow for deflection of the pipe 190 within the void 140, as necessary. In one example aspect, the annular gap 1010 can be sized to allow for between about 2 and 8 degrees of deflection of the pipe 190. In another aspect, the annular gap can be sized to allow between about 4 and 6 degrees of deflection of the pipe 190.

A method of using the hydrant shoe assembly 100 is also provided. The method can comprise coupling the hydrant shoe assembly 100 to the pipe 190 at the inlet end 120, coupling the hydrant shoe assembly 100 to a fire hydrant (not shown) at the outlet end 130, and transporting water from the pipe 190 to the fire hydrant. As described above, in example aspects, coupling the hydrant shoe assembly 100 to the pipe 190 at the inlet end 120 can comprise engaging the first and second harnesses 160a,160b of the hydrant shoe assembly 100 with the pipe 190. Furthermore, in example aspects, coupling the hydrant shoe assembly 100 to the fire hydrant can comprise mounting the mounting flange 416 of the hydrant shoe assembly 100 to the fire hydrant. In some aspects, coupling the hydrant shoe assembly 100 to the fire hydrant can comprise mounting the mounting flange 416 to a riser pipe of the fire hydrant. In one example aspect, the mounting flange 416 can be mounted to the fire hydrant with one or more fastener (not shown). For example, the fasteners can be nut and bolt assemblies, wherein each of the bolts is configured to extend through a corresponding mounting aperture 418 of the mounting flange 416. Transporting water from the pipe 190 to the fire hydrant can comprise flowing water through the void 140 of the hydrant shoe assembly 100 from the inlet end 120 to the outlet end 130.

Figure 11:
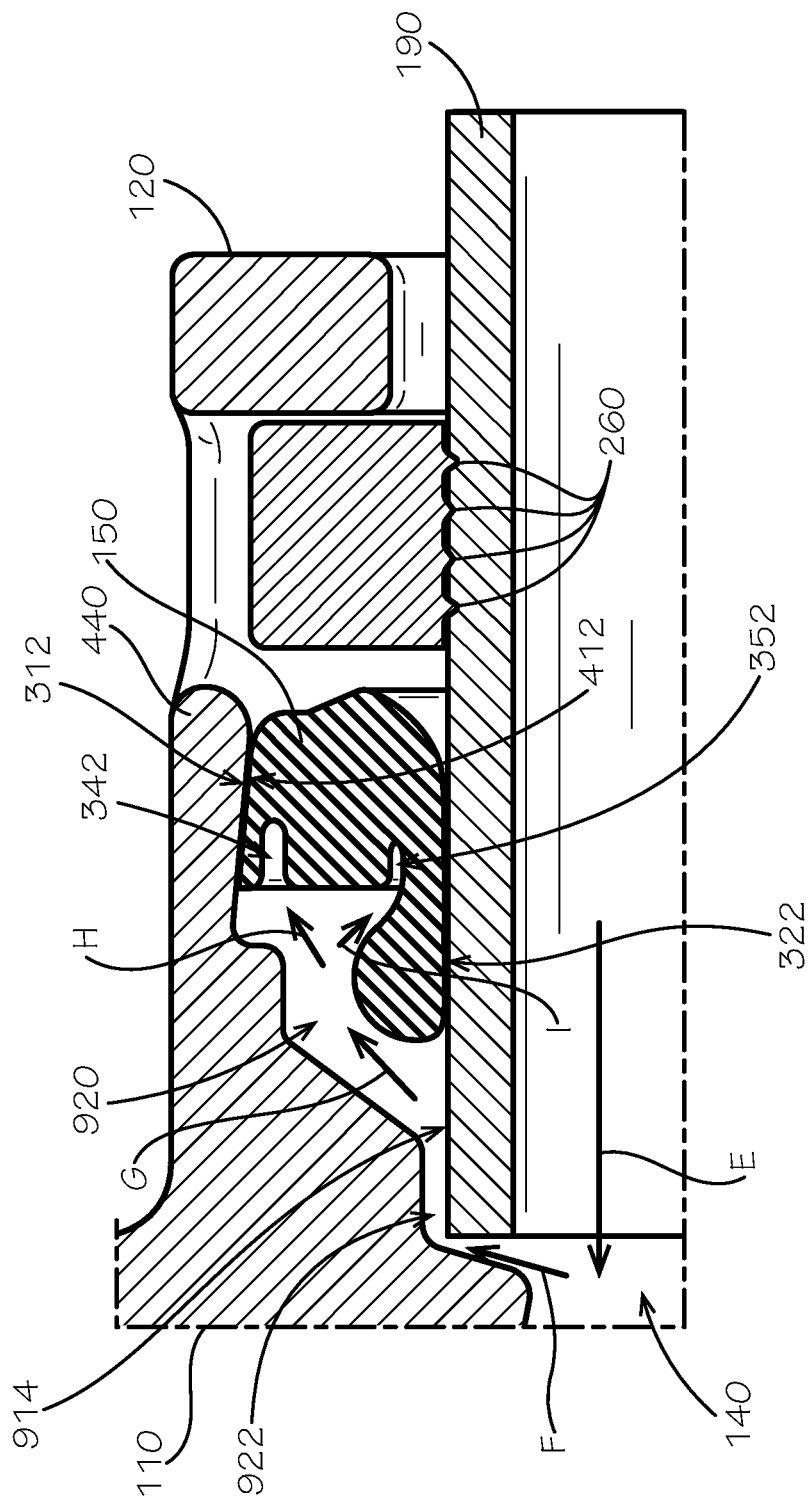
FIG. 11 is a close-up, cross-sectional view of the hydrant shoe assembly of FIG. 1 engaged with the pipe of FIG. 1 in the tightened configuration, taken along line A-A of FIG. 1.

Furthermore, referring to FIG. 11, as water flows from the pipe 190 into the void 140, as indicated by directional arrow E, water pressure can force water through the access channel 922 and into the chamber 920, as indicated by the directional arrows F and G, respectively. Furthermore, water can be forced into the first groove 342 and second groove 352 of the gasket 150, as indicated by the directional arrows H and I, respectively. The water pressure can force the outer sealing surface 312 of the gasket 150 against the inner surface 412 of the gasket channel 440 and can force the inner sealing surface 322 of the gasket 150 against the outer surface 914 of the pipe 190 for an improved seal between the gasket 150, the pipe 190, and the shoe body 110. Furthermore, as shown, the inner surface 412 of the shoe body 110 at the gasket channel 440 can be angled radially inward towards the inlet end 120 of the shoe body 110. The inward angle of the gasket channel 440 can increase the compression of the gasket 150 between the gasket channel 440 and the pipe 190 for an improved seal.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A hydrant shoe assembly comprising:
a shoe body defining a shoe body outer surface and a shoe body inner surface, the shoe body inner surface defining a void, the void defining an inlet end and an outlet end, an opening extending from the shoe body inner surface to the shoe body outer surface, the opening oriented proximate to the inlet end;
a harness received in the void, the harness defining a harness inner surface and a harness outer surface, a protuberance extending radially outward from harness outer surface, the protuberance engaging the opening to prohibit axial and rotational movement of the harness relative to the shoe body; and
a pipe extending into the void through the inlet end, the harness inner surface engaging the pipe to restrain the pipe relative to the shoe body.

2. The hydrant shoe assembly of claim 1, wherein the harness defines an arcuate spine, the arcuate spine defining the harness inner surface and the harness outer surface.

3. The hydrant shoe assembly of claim 1, wherein the harness further defines a first fastener lug extending from a first end of the harness and a second fastener lug extending from a second end of the harness.

4. The hydrant shoe assembly of claim 3, wherein the shoe body defines a first slot and a second slot, the first fastener lug extending through the first slot and the second fastener lug extending through the second slot.

5. The hydrant shoe assembly of claim 4, wherein the shoe body further defines a first gap formed at the inlet end and a second gap formed at the inlet end, the first gap in communication with the first slot and the second gap in communication with the second slot.

6. The hydrant shoe assembly of claim 1, wherein:
the harness is a first harness;
the hydrant shoe assembly further comprises a second harness, the second harness defining a second protuberance, wherein the pipe is oriented between the first harness and second harness, and each of the first harness and second harness engage the pipe;
the shoe body defines a second opening; and
the second protuberance engages the second opening to prohibit axial and rotational movement of the harness relative to the shoe body.

7. The hydrant shoe assembly of claim 6, further comprising a fastener coupling the first harness to the second harness.

8. The hydrant shoe assembly of claim 7, wherein:
the fastener comprises a bolt and a nut;
a spring is mounted to a shank of the bolt; and
the spring is oriented between the first harness and the second harness.

9. The hydrant shoe assembly of claim 1, further comprising a gasket received in the void, the gasket defining an outer sealing surface and an inner sealing surface, the outer sealing surface engaging the shoe body and the inner sealing surface engaging the pipe.

10. The hydrant shoe assembly of claim 9, wherein the harness is oriented between the gasket and the inlet end of the shoe body.

11. The hydrant shoe assembly of claim 9, wherein:
the shoe body inner surface defines a gasket channel configured to receive the gasket; and
the shoe body inner surface defines a harness channel configured to receive the harness.

12. The hydrant shoe assembly of claim 9, wherein the gasket defines an inner sealing ring, an outer sealing ring, and a center ring between the inner and outer sealing rings, a first groove formed between the outer sealing ring and the center ring, and a second groove formed between the inner sealing ring and the center ring.

13. The hydrant shoe assembly of claim 1, wherein the harness further defines a rib extending from the harness inner surface, the rib engaging an outer surface of the pipe.

14. The hydrant shoe assembly of claim 13, wherein:
the rib is a first rib defining a first height;
the harness further defines a second rib extending from the harness inner surface and defining a second height, wherein the second height is different from the first height; and
each of the first rib and second rib engage the outer surface of the pipe.

15. The hydrant shoe assembly of claim 1, wherein the shoe body further comprises a mounting flange at the outlet end, the mounting flange defining mounting apertures formed therethrough.

16. A method for assembling a hydrant shoe assembly comprising:
providing a shoe body, the shoe body defining a shoe body outer surface and a shoe body inner surface, the shoe body inner surface defining a void, an opening extending from the shoe body outer surface to the shoe body inner surface;
inserting a harness into the void;
engaging a protuberance of the harness with the opening in the shoe body, the harness defining a harness inner surface and a harness outer surface, the protuberance extending from the harness outer surface; and
engaging a pipe with the harness inner surface to restrain the pipe relative to the shoe body.

17. The method of claim 16, wherein engaging a pipe with the harness inner surface comprises pressing a ridge extending from the harness inner surface into an outer surface of the pipe.

18. The method of claim 16, wherein the shoe body further comprises a gasket received in the void, the method further comprising engaging an outer surface of the pipe with the gasket.

19. The method of claim 16, wherein:
the harness is a first harness;
the method further comprises inserting a second harness into the void and engaging a second protuberance of the second harness with a second opening in the shoe body; and
the pipe is received between the first harness and the second harness.

20. The method of claim 19, wherein;
the first harness is coupled to the second harness; and
the method further comprises pressing a first rib of the first harness into an outer surface of the pipe and pressing a second rib of the second harness into the outer surface of the pipe.

\* \* \* \* \*